(12) United States Patent
Li et al.

(10) Patent No.: US 9,338,305 B2
(45) Date of Patent: May 10, 2016

(54) CALLING BACK A DEVICE THAT MADE A CALL

(71) Applicant: Verizon Patent and Licensing Inc., Arlington, VA (US)

(72) Inventors: Mingxing S. Li, San Jose, CA (US); Priscilla Lau, Fremont, CA (US); Ce Xu, San Ramon, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/468,719

(22) Filed: Aug. 26, 2014

(65) Prior Publication Data
US 2016/0065748 A1 Mar. 3, 2016

(51) Int. Cl.
*H04M 11/04* (2006.01)
*H04M 3/42* (2006.01)

(52) U.S. Cl.
CPC .......... *H04M 11/04* (2013.01); *H04M 3/42195* (2013.01)

(58) Field of Classification Search
None
See application file for complete search history.

(56) References Cited

U.S. PATENT DOCUMENTS

| | | | | |
|---|---|---|---|---|
| 6,167,119 A * | 12/2000 | Bartholomew | ...... | H04Q 3/0045 379/201.02 |
| 6,850,600 B1 * | 2/2005 | Boeckman | ...... | H04Q 3/0029 379/221.09 |
| 7,822,188 B1 * | 10/2010 | Kirchhoff | ...... | H04M 3/436 379/211.02 |
| 8,229,471 B1 * | 7/2012 | Kirkham | ...... | H04W 4/021 455/456.1 |
| 8,649,498 B1 * | 2/2014 | Rankin | ...... | H04M 3/42314 379/219 |
| 2003/0056226 A1 * | 3/2003 | Lazarus | ...... | H04N 7/17309 725/129 |
| 2010/0128857 A1 * | 5/2010 | Logan | ...... | H04M 3/42229 379/88.22 |
| 2010/0177662 A1 * | 7/2010 | Meincke | ...... | H04M 15/00 370/254 |
| 2013/0003942 A1 * | 1/2013 | Bennett | ...... | H04M 3/42229 379/70 |
| 2015/0156321 A1 * | 6/2015 | Abnett | ...... | G06Q 50/12 379/45 |
| 2015/0358476 A1 * | 12/2015 | Flores-Estrada | ...... | H04M 15/56 370/259 |

* cited by examiner

Primary Examiner — Maria El-Zoobi

(57) ABSTRACT

A device may receive a first call associated with a virtual phone number associated with a first user device and a second user device. The device may determine, and may store information indicating, that the first call was made using the first user device. The device may receive a second call directed to the virtual phone number and may determine whether the second call comprises a call back associated with the first call. The device may selectively send the second call to the first user device or to the first and second user devices based on determining whether the second call comprises the call back. The second call may be sent to the first and second user devices when the second call does not comprise the call back and may be sent to the first user device when the second call comprises the call back.

20 Claims, 11 Drawing Sheets

| Virtual Phone Number 510 | Device ID 520 | Instance ID 530 | Description 540 | Rules 550 |
|---|---|---|---|---|
| (123) 456-7890 | MDN | Non-virtual Phone Number | Primary Cell Phone | Rules:<br>Rule 1: Ring all devices<br>Rule 2: Ring primary cell phone, then (if no answer) ring secondary cell phone, then (if no answer) ring all devices<br><br>Conditions:<br>Apply Rule 1 if call received:<br>Monday – Friday, 12AM – 8AM;<br>Monday – Friday, 5PM – 12AM;<br>Saturday; or<br>Sunday<br>Apply Rule 2 if:<br>Conditions for Rule 1 are not met; or<br>No answer to an emergency call back |
| | IMEI | MDN | Secondary Cell Phone | |
| | MAC Address | MAC Address | Tablet | |
| | IP Address | Description | Laptop | |

FIG. 5

CALLING BACK A DEVICE THAT MADE A CALL

BACKGROUND

Emergency personnel (e.g., fire personnel, medical personnel, police, etc.) may receive an emergency call from a communication device, such as a landline telephone, a cellular telephone, etc. The emergency call may include call information that identifies a telephone number associated with the communication device. After the emergency call ends, the emergency personnel may use the telephone number to place a call to the communication device.

BRIEF DESCRIPTION OF THE DRAWINGS

FIG. 5 is an example data structure for storing virtual phone number information;

DETAILED DESCRIPTION OF PREFERRED EMBODIMENTS

The following detailed description of example implementations refers to the accompanying drawings. The same reference numbers in different drawings may identify the same or similar elements.

A user may have multiple devices, such as, for example, a landline telephone, a cellular telephone, a tablet, a computer device, or the like, from which the user is able to make and/or receive a telephone call. Each of the devices may be associated with its own phone number and/or a shared or virtual phone number. When placing a call using any one of the devices, the called party may see the call as coming from the virtual phone number (e.g., a caller ID service provided to the called party causes the virtual phone number to be displayed). When a call is directed to the virtual phone number (e.g., another user dials the virtual phone number to call the user), the call may be sent to each device associated with the virtual phone number. Each device may receive the call and provide an indication (e.g., ring, vibrate, display a message, etc.) to notify the user that the call is being received at the device.

In an emergency situation, the user may place an emergency call using one of the devices associated with the virtual phone number. An emergency call device (e.g., an emergency response call center, a device used by emergency response personnel, etc.) may receive the emergency call and may see the emergency call as coming from the virtual phone number. After communicating with the user, emergency personnel associated with the emergency call device may wish to speak with the user after the emergency call has ended (e.g., to provide additional assistance, to obtain additional information, to reconnect during a dropped call, to reconnect after the call unexpectedly ends, etc.). The emergency call device may use the virtual phone number to call the user back (referred to herein as an "emergency call back"). Using the virtual phone number to call the user back may cause the emergency call back to be sent to each of the user's devices that are associated with the virtual phone number (e.g., each device will ring as a result of the emergency call back). Someone other than the user may hear one of the other devices ringing and may answer the call using the other device thereby preventing the emergency personnel from reaching the user.

Implementations described herein may cause an emergency call back to be sent to only the device from which the emergency call was made (e.g., only the device used to make the emergency call will ring as a result of the emergency call back) thereby allowing emergency personnel to speak with the user.

While implementations, described herein, relate to placing an emergency call and receiving an emergency call back, the implementations are not limited to emergency calls. Some implementations may cause a non-emergency call to be sent back to a particular device that was recently (e.g., within a threshold amount of time) used to place a call.

Figure 1A:
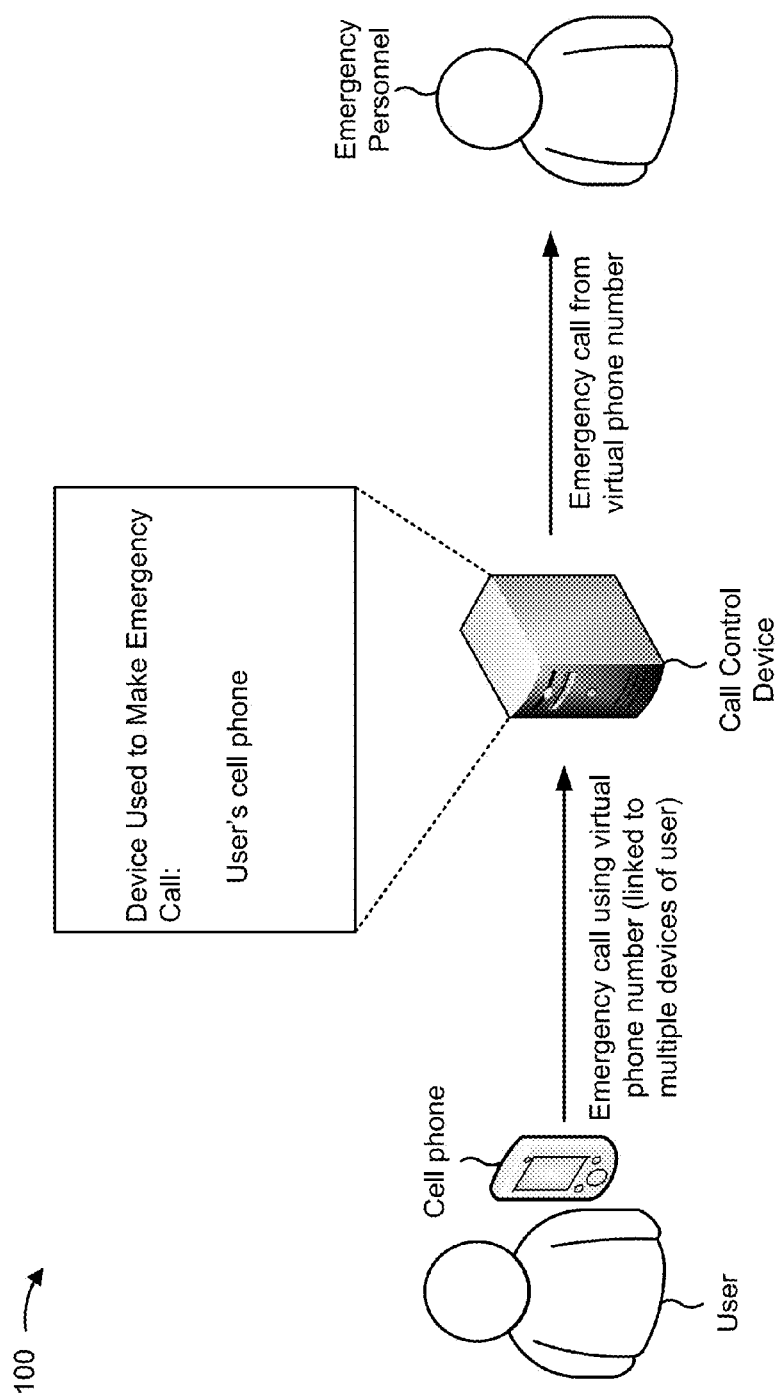
FIGS. 1A and 1B are diagrams of an overview of an example implementation described herein.
Figure 1B:
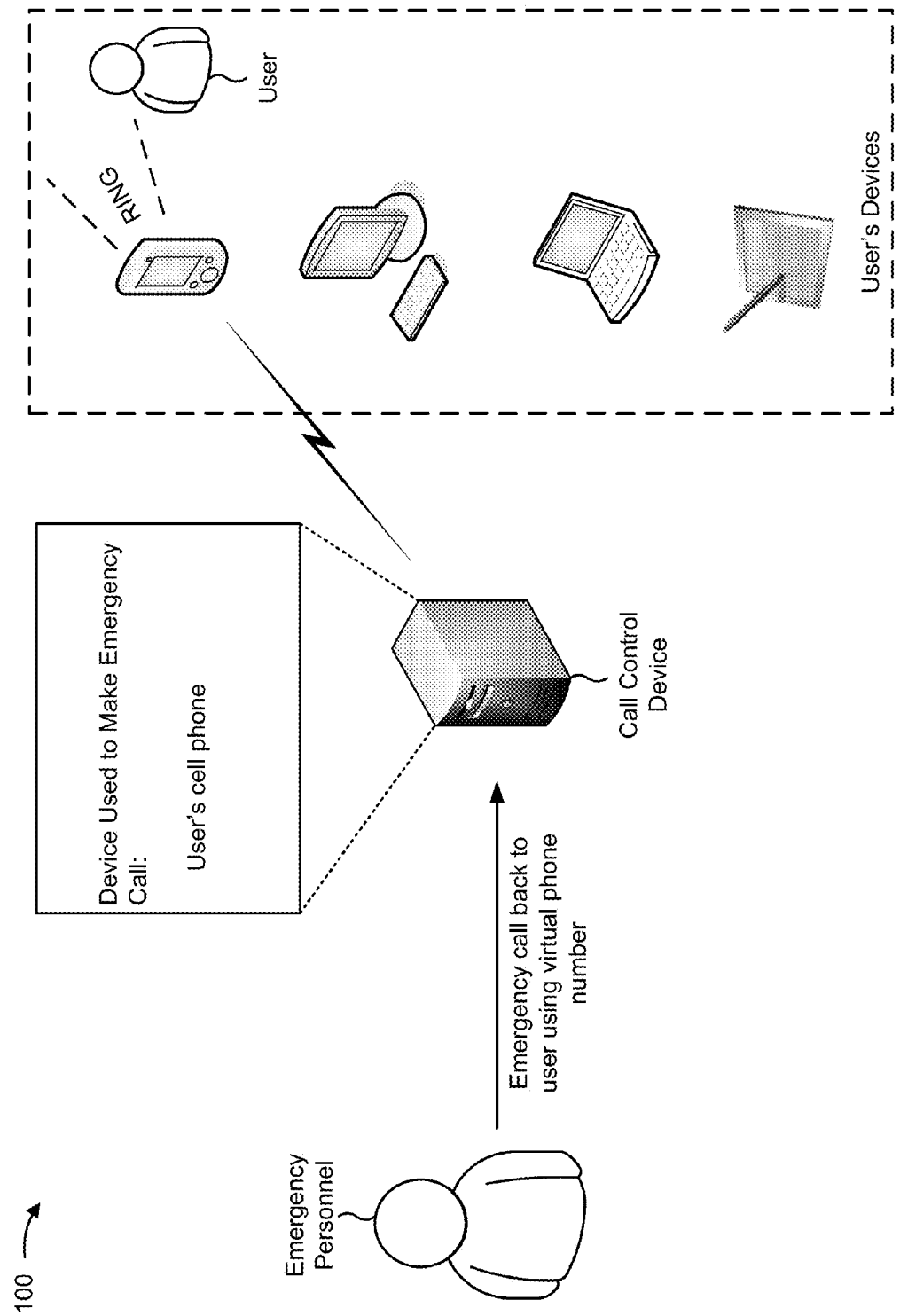

FIGS. 1A and 1B are diagrams of an overview of an example implementation 100 described herein. As shown in FIG. 1A, assume that a user places an emergency call using the user's cellular telephone. The call control device may detect the emergency call, and may detect that the emergency call is associated with a virtual phone number that is shared or associated with multiple devices. To distinguish the cellular telephone from the other devices as the device used to make the emergency call, the call control device may store an identifier or other information indicating that the emergency call was made using the cellular telephone. The call control device may then transmit the emergency call to an emergency call device associated with emergency personnel.

With reference to FIG. 1B, after the emergency call has ended, emergency personnel may choose to contact the user (e.g., to obtain additional information, to further emergency response efforts, etc.). The emergency call device may use the virtual phone number to place an emergency call back to the user. The call control device may receive the emergency call back, and may determine that the emergency call back is directed to the virtual phone number. The call control device may use the stored information to determine that the emergency call was made using the cellular telephone. The call control device may then cause the emergency call back to be received at only the cellular telephone (e.g., only the cellular telephone will ring as a result of the emergency call back). In this way, the call control device may ensure that emergency personnel are not prevented from reconnecting with the user due to the emergency call back being answered by another person who may otherwise answer the call when one of the other devices rings as a result of receiving the emergency call back.

Figure 2:
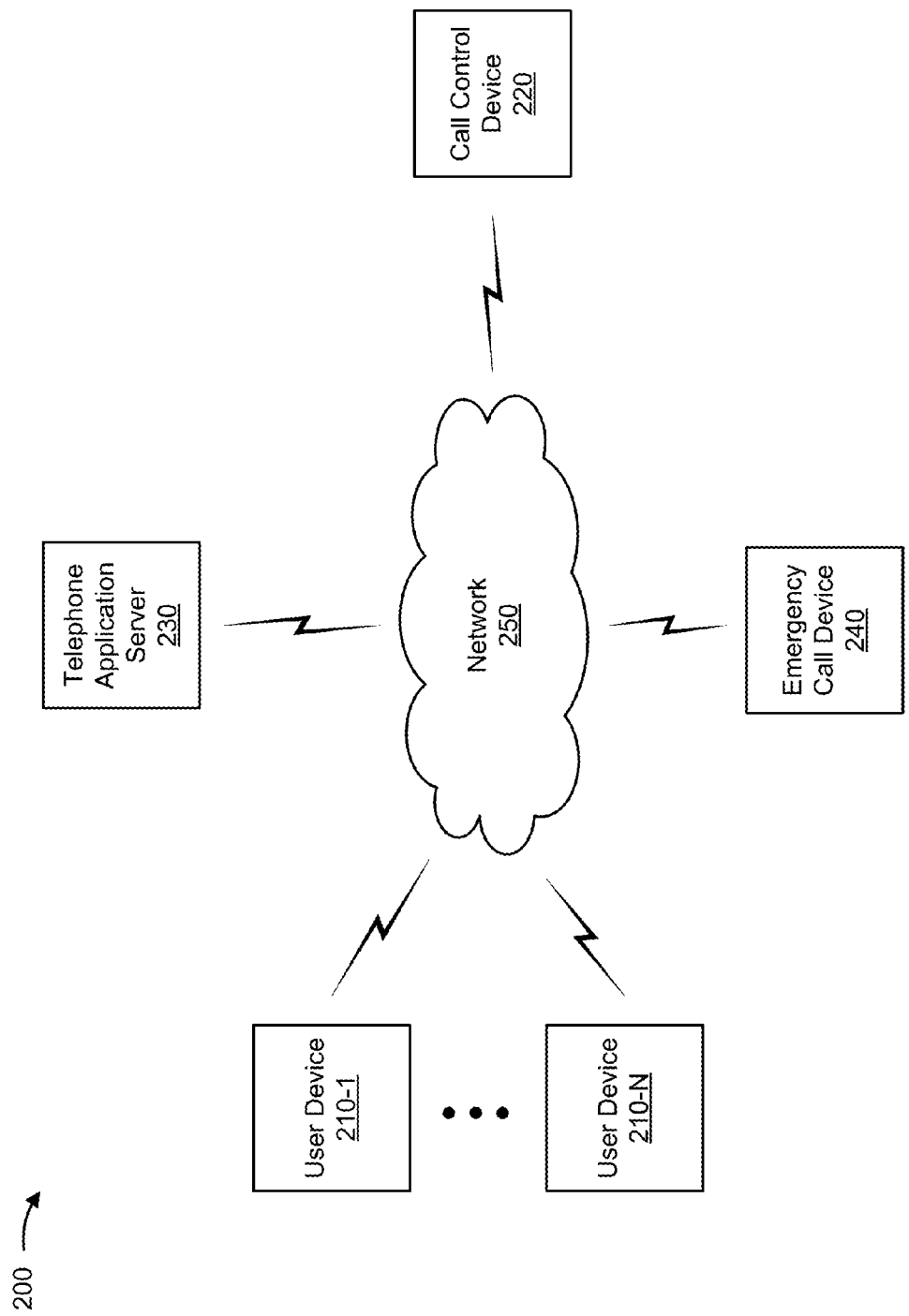
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user devices 210-1, . . . , 210-N (N>1) (hereinafter referred to collectively as "user devices 210," and individually as "user device 210"), a call control device 220, a telephone application server 230, and an emergency call device 240 interconnected via network 250. The devices of environment 200 may communicate via wired connections, wireless connections, or a combination of wired and wireless connections.

User device 210 may include a device capable of making and/or receiving a call (e.g., a voice call, a video call, etc.). For example, user device 210 may include a landline telephone, a mobile telephone (e.g., a smart phone, a radiotelephone, etc.), a computing device (e.g., a desktop computer, a laptop computer, a tablet computer, a handheld computer, etc.), a set top box, or another type of device capable of making and/or receiving a call.

Call control device 220 may include one or more computation or communication devices, such as a call session control function (CSCF) server or another type of server device, a gateway, a switch, a central office, or the like. For example, call control device 230 may include a device capable of receiving, processing, storing, and/or providing information associated with an emergency call, such as a device identifier associated with user device 210, a virtual phone number associated with user device 210, etc. Call control device 230 may include a device capable of processing and/or connecting calls between two or more devices, such as user device 210 and/or emergency call device 240.

Telephone application server 230 may include one or more computation or communication devices, such as a server device. For example, telephone application server 230 may receive, store, and/or provide subscription-related information (e.g., subscriber profiles) associated with user device 210. Telephone application server 230 may receive calls directed to user device 210 from call control device 220 and may process the received calls based on features that are enabled and/or activated for user device 210.

Emergency call device 240 may include a device capable of receiving and/or returning emergency calls. For example, emergency call device 260 may include a landline telephone, a mobile telephone (e.g., a smart phone, a radiotelephone, etc.), a computing device (e.g., a desktop computer, a laptop computer, a tablet computer, handheld computer, etc.), a collection of communication devices (e.g., a call center), a public safety answering point (PSAP), or a similar device.

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a cloud computing network, or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
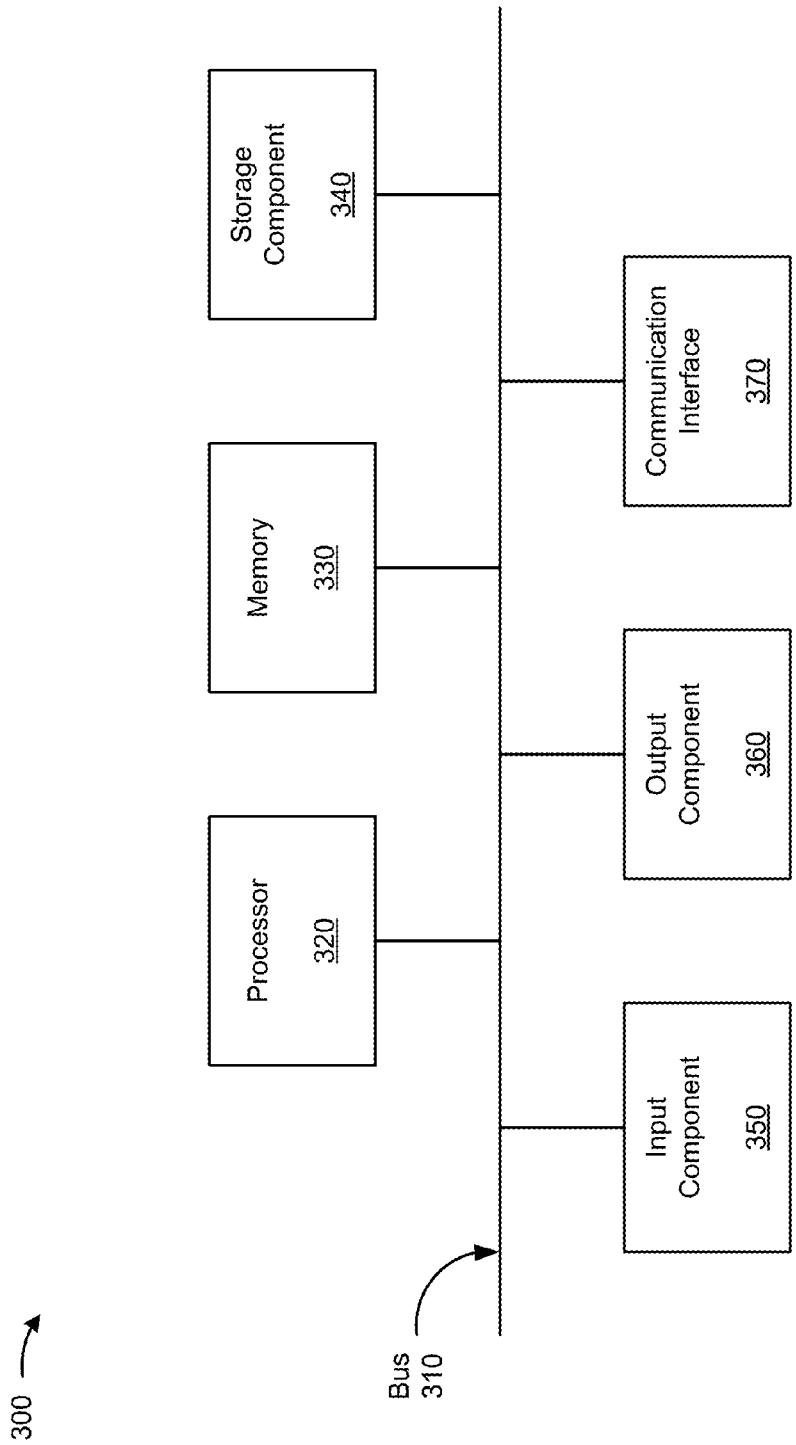
FIG. 3 is a diagram of example components of one or more devices of FIG. 2.

FIG. 3 is a diagram of example components of a device 300. Device 300 may correspond to user device 210, call control device 220, telephone application server 230, and/or emergency call device 240. In some implementations, user device 210, call control device 220, telephone application server 230, and/or emergency call device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
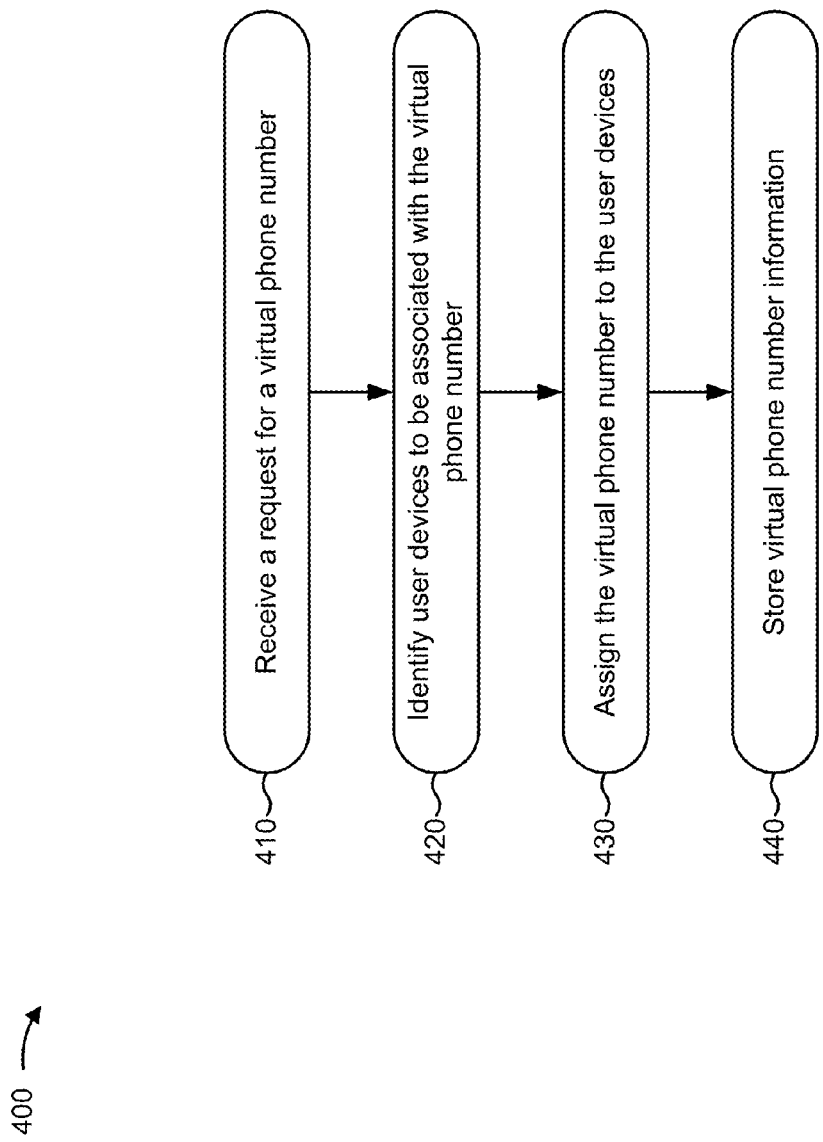
FIG. 4 is a flow chart of an example process for associating a group of user devices with a virtual phone number.

FIG. 4 is a flow chart of an example process 400 for associating a group of user devices 210 with a virtual phone number. In some implementations, one or more process blocks of FIG. 4 may be performed by telephone application server 230. Additionally, or alternatively, one or more process blocks of FIG. 4 may be performed by another device or a group of devices separate from or including telephone application server 230, such as call control device 220.

As shown in FIG. 4, process 400 may include receiving a request for a virtual phone number (block 410). For example, telephone application server 230 may receive a request for a virtual phone number from user device 210. A user may have multiple user devices 210 from which the user is able to make and/or receive a call (e.g., a voice call, a video call, etc.). The user may desire to have each of the user devices 210 associated with a virtual phone number to allow the user to receive calls directed to the virtual phone number at each of the user devices 210. The user may use one of the user devices 210 to request the virtual phone number and telephone application server 230 may receive the request. In some implementations, user device 210 may transmit the request to a network service provider that provides service for the user devices 210. Telephone application server 230 may receive the request from the network service provider.

As further shown in FIG. 4, process 400 may include identifying user devices to be associated with the virtual phone number (block 420). For example, telephone application server 230 may identify user devices 210 that are to be associated with the virtual phone number. In some implementations, telephone application server 230 may identify the user devices 210 based on information included in the request. For example, the request may include information identifying the user devices 210 that are to be associated with the virtual phone number.

Alternatively, or additionally, the request may include information identifying the user. Telephone application server 230 may access a user profile associated with the user and may identify user devices 210 to be associated with the virtual phone number based on the user profile. The user profile may include information identifying user devices 210 associated with the user and/or information identifying particular user devices 210 that are to be associated with the virtual phone number. Telephone application server 230 may identify the identified user devices 210 as the user devices 210 that are to be associated with the virtual phone number.

In some implementations, user devices 210, that are to be associated with the virtual phone number, may be selected from a list of user devices. For example, in response to receiving the request, telephone application server 230 may provide a list of user devices 210 to user device 210 from which the request was received. User device 210 may provide the list of user devices 210 for display to the user and the user may select two or more user devices 210 from the list. User device 210 may send information identifying the selected user devices 210 to telephone application server 230. Telephone application server 230 may identify the selected user devices 210 as the user devices 210 that are to be associated with the virtual phone number.

As further shown in FIG. 4, process 400 may include assigning the virtual phone number to the user devices (block 430). For example, telephone application server 230 may assign the virtual phone number to the identified user devices 210. The virtual phone number may include a string of characters (e.g., in the format of XXX-XXX-XXXX, XXX-XXXX, etc.) that can be used by a calling party to call the user at user devices 210 associated with the virtual phone number.

In some implementations, the virtual phone number may be assigned based on information included in the request. For example, the request may include information identifying the virtual phone number. Telephone application server 230 may parse the request to determine the virtual phone number and may assign the determined virtual phone number to user devices 210.

In some implementations, the virtual phone number may be selected from a pool of virtual phone numbers. For example, telephone application server 230 may maintain a pool of virtual phone numbers available to be assigned to user devices 210. Telephone application server 230 may select one of the virtual phone numbers from the pool of virtual phone numbers and may assign the selected virtual phone number to user devices 210.

In some implementations, the virtual phone number may be assigned based on a phone number associated with user devices 210. For example, one of user devices 210 may include a phone number. Telephone application server 230 may determine the phone number of that user device 210 and may use the phone number as the virtual phone number.

As further shown in FIG. 4, process 400 may include storing virtual phone number information (block 440). For example, telephone application server 230 may store virtual phone number information that indicates that the virtual phone number is assigned to the user devices 210. In some implementations, telephone application server 230 may store the virtual phone number information in a data structure, such as described below with regard to FIG. 5.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is an example data structure 500 for storing virtual phone number information. In some implementations, data structure 500 may be stored in a memory of telephone application server 230. In some implementations, data structure 500 may be stored in a memory separate from, but accessible by, telephone application server 230. In some implementations, data structure 500 may be stored in a memory, associated with another device or a group of devices, separate from, or in combination, with memory associated with telephone application server 230.

As shown in FIG. 5, data structure 500 may include a virtual phone number field 510, a device ID field 520, an instance ID field 530, a description field 540, and a rules field 550.

Virtual phone number field 510 may include information identifying a virtual phone number assigned to a group of user devices 210 identified in device ID field 520 and/or instance ID field 530. In some implementations, the virtual phone number may include a string of characters, such as numbers, letters, and/or symbols, used to place a call. As shown in FIG. 5, virtual phone number field 510 includes the string "(123) 456-7890."

Device ID field 520 may store information identifying each user device 210 associated with the virtual phone number identified in virtual phone number field 510. For example, device ID field 520 may store information identifying a mobile device number (MDN), an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), a media access control (MAC) address, an Internet Protocol (IP) address, a uniform resource locator (URL), etc. associated with each user device 210 associated with the virtual phone number. As shown in FIG. 5, device ID field 520 includes "MDN," "IMEI," "MAC Address," and "IP Address" to identify user devices 210 associated with the virtual phone number stored in virtual phone number field 510.

Instance ID field 530 may store information associated with a particular user device 210 from which an emergency call may be received and/or to which an emergency call back may be sent. For example, instance ID field 530 may store information that uniquely identifies each user device 210 from other user devices 210 associated with the virtual phone number. In some implementations, instance ID field 530 may store information that is the same as the information stored in device ID field 530. Alternatively, or additionally, instance ID field may store information that is different from the information stored in device ID field 520. As shown in FIG. 5, instance ID field 530 includes "Non-virtual Phone Number," "MDN," "MAC Address," and "Description" to identify instance IDs associated with corresponding user devices 210 identified by device ID field 520.

Description field 540 may include descriptive information associated with each user device 210 associated with the virtual phone number. The descriptive information may enable a user associated with user devices 210 to easily identify each user device 210 from the other user devices 210. As shown in FIG. 5, the descriptive information includes "primary cell phone," "secondary cell phone," "tablet," and "laptop."

Rules field 550 may include information identifying a set of rules associated with the virtual phone number. For example, a user associated with user devices 210 may provide information identifying one or more rules to be applied to calls directed to the virtual phone number and/or one or more rules to be applied to an emergency call back that is not answered when the emergency call back is sent to a user device 210 that was used to make an emergency call. Rules field 550 may store information identifying each of the rules provided by the user. As shown in FIG. 5, rules field 550 may include information identifying a first rule "Ring all devices" and a second rule "Ring primary cell phone, then (if no answer) ring secondary cell phone, then (if no answer) ring all devices."

In some implementations, rules field 550 may include information identifying one or more conditions associated with the set of rules. For example, the user may provide information indicating that a particular rule is to be applied when certain conditions are met. As shown in FIG. 5, rules field 550 may include "Apply Rule 1 if call received: Monday-Friday, 12 AM-8 AM; Monday-Friday, 5 PM-12 AM; Saturday; or Sunday" and "Apply Rule 2 if: Conditions for Rule 1 are not met; or No answer to an emergency call back."

While FIG. 5 shows example fields 510-550, in other implementations, data structure 400 may include fewer fields, different fields, additional fields, or differently arranged fields than depicted in FIG. 5.

Figure 6A:
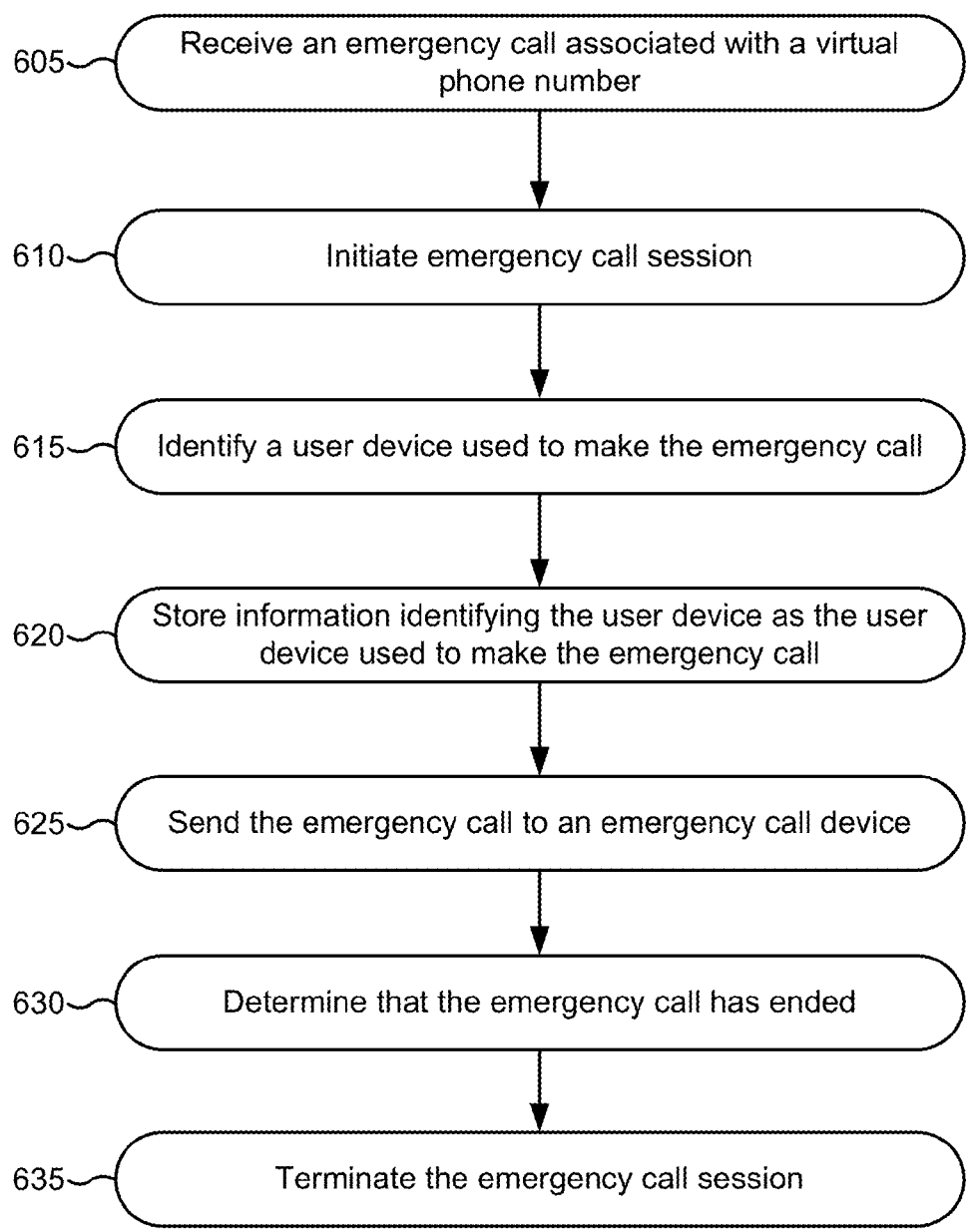
FIGS. 6A and 6B are a flow chart of an example process for sending an emergency call back to a user device from which an emergency call was made.
Figure 6B:
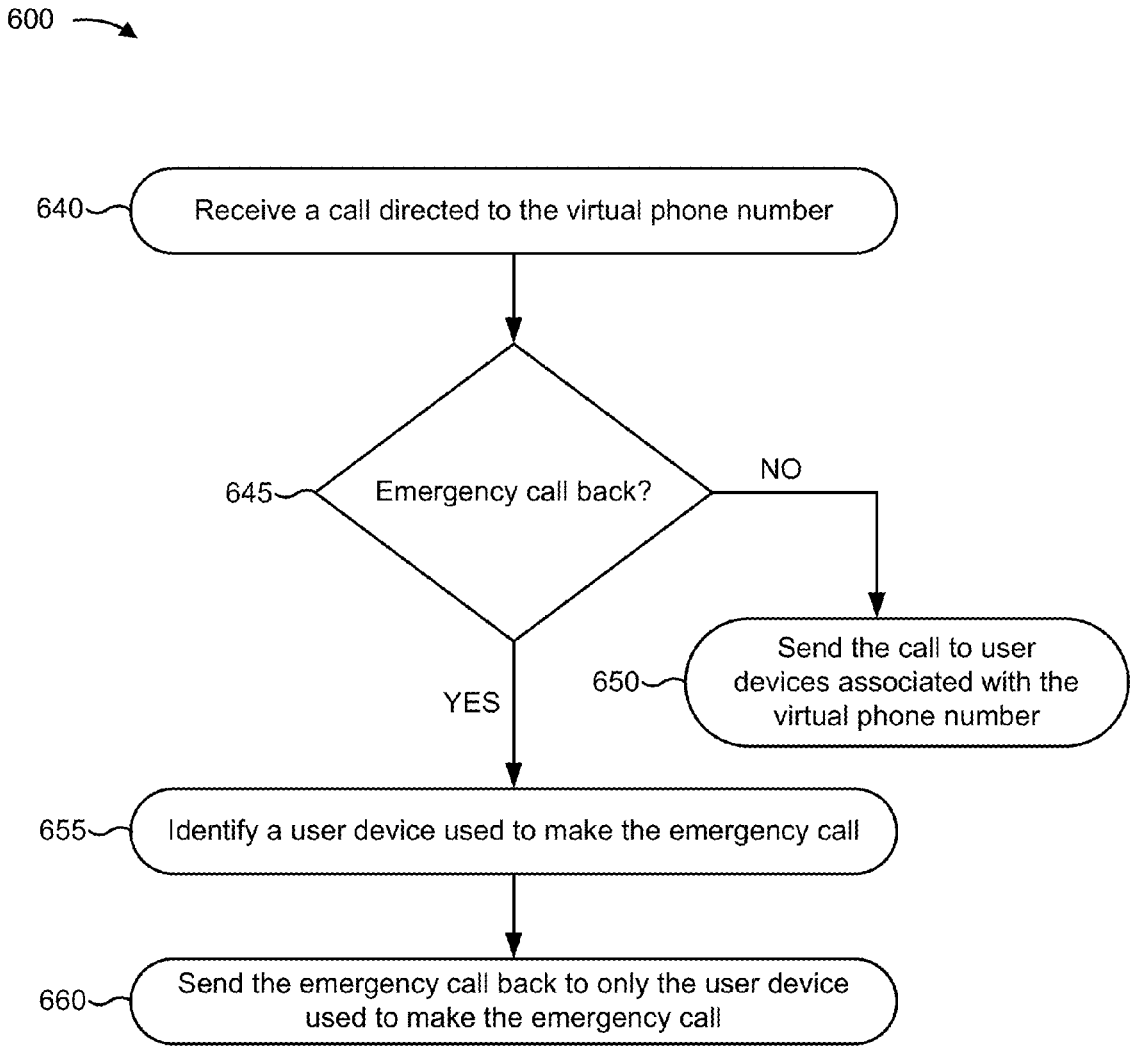

FIGS. 6A and 6B are a flow chart of an example process 600 for sending an emergency call back to a user device from which an emergency call was made. In some implementations, one or more process blocks of FIGS. 6A and 6B may be performed by call control device 220. In some implementations, one or more process blocks of FIGS. 6A and 6B may be performed by another device or a group of devices separate from or including call control device 220, such as telephone application server 230 and/or emergency call device 240.

As shown in FIG. 6A, process 600 may include receiving an emergency call associated with a virtual phone number (block 605). For example, a user may have multiple user devices 210 associated with a virtual phone number. The user may use a particular user device 210, of the multiple user devices 210, to place an emergency phone call. Call control device 220 may receive the emergency call and may determine that the emergency call was placed by a user device 210 that is associated with a virtual phone number.

In some implementations, the emergency call may include a call placed to emergency services. For example, an emergency call may include a call placed to emergency police services, emergency fire services, emergency medical services, or the like. In some implementations, the emergency call may be made by dialing an emergency number (e.g., "911" in the United States, "112" in parts of Europe, etc.). Additionally, or alternatively, the emergency call may be placed by contacting an operator (e.g., an operator of a communication network) and requesting to be connected to emergency services.

In some implementations, the emergency call may include a call over the Internet using voice over internet protocol (VOIP). Additionally, or alternatively, the emergency call may include a video call, an instant message (IM) exchange, a short message service (SMS) exchange, and/or any other type of real-time communication.

In some implementations, the emergency call may be based on a session initiation protocol (SIP) and may include a SIP invite message for initiating an emergency call session. Call control device 220 may determine that the emergency call is associated with the virtual phone number based on the SIP invite message. For example, the SIP invite message may include call information. The call information may include information identifying the virtual phone number, the particular user device 210, and/or the user. Call control device 220 may access a data structure (e.g., data structure 500) and may use the call information to determine that the particular user device 210 used to make the emergency call is associated with the virtual phone number. In some implementations, the data structure may be stored by another device such as, for example, telephone application server 230, a home subscriber server, and/or a similar type of device, and call control device 220 may send the call control information to the other device to determine that the emergency call is associated with the virtual phone number.

As further shown in FIG. 6A, process 600 may include initiating an emergency call session (block 610). For example, call control device 220 may initiate an emergency call session based on receiving the emergency call.

In some implementations, call control device 220 may initiate the emergency call session by starting an emergency call session timer and/or storing emergency call session information. The emergency call session information may include information identifying the virtual phone number, a time at which the emergency call was received by call control device 220, a time at which the emergency call was placed, an elapsed time of the session (e.g., from the time the emergency call was received to a current time), a session threshold, or the like.

As further shown in FIG. 6A, process 600 may include identifying a user device used to make the emergency call (block 615). For example, call control device 220 may identify the particular user device 210 as the user device used to make the emergency call.

In some implementations, call control device 220 may identify the particular user device 210 as the user device used to make the emergency call based on information received with the emergency call. For example, the emergency call may be based on the SIP protocol and may include the SIP invite message. The SIP invite message may include information identifying the particular user device 210 as the user device used to make the emergency call.

As further shown in FIG. 6A, process 600 may include storing information identifying the user device as the user device used to make the emergency call (block 620). For example, call control device 220 may store information identifying the particular user device 210 as the user device used to make the emergency call.

In some implementations, call control device 220 may store information associated with the particular user device 210. For example, call control device 220 may associate the virtual phone number with the particular user device 210 by storing information associated with the particular user device 210 in association with information identifying the virtual phone number. The information associated with the particular user device 210 may include a device ID (e.g., a MDN, an IMSI, an IMEI, an ESN, a MIN, a MSISDN number, a NAI, a MAC address, an IP address, a URI, etc.), an instance ID, descriptive information, and/or a non-virtual phone number associated with the particular user device 210.

In some implementations, the information identifying the particular user device 210 as the user device used to make the emergency call may be stored by call control device 210. For example, the information identifying the particular user device 210 as the user device used to make the emergency call may be stored with the emergency call session information.

Alternatively, or additionally, the information identifying the particular user device 210 as the user device used to make the emergency call may be stored by another device. For example, call control device 220 may send the information identifying the particular user device 210 as the user device used to make the emergency call to telephone application server 230 and telephone application server 230 may store the information identifying the particular user device 210 as the user device used to make the emergency call.

As further shown in FIG. 6A, process 600 may include sending the emergency call to an emergency call device (block 625). For example, call control device 220 may send the emergency call to emergency call device 240.

In some implementations, call control device 220 may transmit the emergency call based on the call information. The call information may include information that identifies a device location associated with the particular user device 210 and call control device 220 may transmit the emergency call based on a location of the particular user device 210. In this instance, call control device 220 may determine the location of the particular user device 210 and may transmit the emergency call to a particular emergency call device 220 associated with the location. For example, call control device 220 may transmit an emergency call placed from user device 210 in a particular location (e.g., Atlanta, Ga.) to an emergency call device located in that area (e.g., a police station in Atlanta, a fire department in Atlanta, a hospital in Atlanta, etc.).

In some implementations, call control device 220 may transmit the emergency call by use of an emergency routing service (ERS). The ERS may include a device and/or a system of devices capable of identifying a particular emergency call device 220 in a location associated with the particular user device 210. For example, call control device 220 may receive call information that identifies the location of the particular user device 210. Based on the location, call control device 220 may use the ERS to determine a particular emergency call device 240 associated with the location. Based on the determination, call control device 220 may transmit the emergency call to the particular emergency call device 240. In some implementations, call control device 220 may transmit the emergency call by use of a routing key, such as an emergency server routing key (ESRK), an emergency service querying key (ESQK), or the like.

In some implementations, call control device 220 may transmit call information in addition to transmitting the emergency call. For example, call control device 220 may transmit information identifying the device location (e.g., the location of the particular user device 210) to emergency call device 240.

In some implementations, the emergency call may be transmitted via a gateway device. The gateway device may transfer the emergency call from one network to another. For example, the gateway device may transfer the emergency call from an IP network (e.g., the Internet, a 4G network, etc.) to a publicly switched telephone network (PSTN). Additionally, or alternatively, the gateway device may convert the emergency call to a signal capable of being received by a PSAP (e.g., emergency call device 240).

As further shown in FIG. 6A, process 600 may include determining that the emergency call has ended (block 635) and terminating the emergency call session (block 640). For example, call control device 220 may determine that the emergency call has ended and may terminate the emergency call session.

In some implementations, call control device 220 may determine that the emergency call has ended and/or terminate the emergency call session based on detecting a lapse of time. For example, call control device 220 may detect a passage of an amount of time from the time that the emergency call was transmitted, received, disconnected, etc. The lapse in time may be measured from a start and/or an end of the emergency call. Additionally, or alternatively, the lapse in time may be measured from another event, such as from an arrival of emergency personnel on a scene of an emergency, and/or a departure of emergency personnel from the scene of the emergency (which may be indicated, for example, by information received from emergency call device 240).

In some implementations, call control device 220 may determine that the emergency call has ended and/or terminate the emergency call session based on the emergency call session information. For example, call control device 220 may use the emergency session timer to measure the lapse in time. When the emergency session timer reaches a predetermined value (e.g., three hours, one hour, thirty minutes, etc.), call control device 220 may determine that the emergency call has ended. In some implementations, the predetermined value may be updated at the completion of the emergency call. For example, call control device 220 may start a second emergency call timer. The second emergency call timer may be started based on terminating the emergency call session, and the value may be updated (e.g., with a shorter value) when the emergency call has ended and/or the emergency call session has been terminated.

In some implementations, call control device 220 may determine that the emergency call has ended and/or may terminate the emergency call session based on information received from a device, such as the particular user device 210, emergency call device 240, and/or another device (e.g., a proxy call control device, a home subscriber server, a gateway device, etc). For example, the particular user device 210 and/or emergency call device 240 may transmit a notification indicating that the emergency call has ended and/or that the emergency call session is to be terminated to call control device 220.

In some implementations, the notification may be transmitted based on a user input and call control device 220 may determine that the emergency call has ended and/or terminate emergency call session based on the user input. In some implementations, the user input may be provided by emergency personnel. For example, emergency personnel may provide the user input after responding to the emergency call, after determining that the emergency has ended, after creating a report about the emergency call, etc.

Alternatively, or additionally, the user input may be provided by the user of the particular user device 210. For example, the user may provide the user input after completing the emergency call, after emergency personnel has responded to the emergency call, after determining that the emergency has ended, etc.

As shown in FIG. 6B, process 600 may include receiving a call directed to the virtual phone number (block 640). For example, after terminating the emergency call session, call control device 220 may receive a call directed to the virtual phone number.

In some implementations, emergency personnel associated with emergency call device 240 may use the virtual phone number to place an emergency call back to the user of the particular user device 210. In some implementations, the emergency call back may be placed based on the emergency call being interrupted or dropped. In some implementations, the emergency call may be placed based on the emergency call being temporarily placed (e.g., by temporarily storing information associated with the particular user device 210) in a queue and/or based on emergency personnel scheduling the emergency call back at a later point in time. Emergency call device 240 may use the virtual phone number to place the emergency call back, to the particular user device 210, at the later point in time, when the dispatcher becomes available, and/or when the emergency call is at the front of the queue.

As further shown in FIG. 6B, process 600 may include determining whether the received call is an emergency call back (block 645). For example, call control device 220 may determine whether the received call is an emergency call back.

In some implementations, call control device 240 may determine whether the received call is the emergency call back based on a time at which the emergency call session was terminated and/or a time at which the emergency call ended. For example, the received call may include information identifying the virtual phone number and call control device 220 may determine whether emergency session information, associated with the virtual phone number, is stored in a data structure. The emergency session information may expire and/or be removed from the data structure after a lapse of a particular amount of time (e.g., 1 hour, 5 minutes, 30 seconds, etc.) from when the emergency call session was terminated and/or the emergency call ended. If the emergency session information is expired and/or is not stored in the data structure, call control device 220 may determine that the received call is not an emergency call back.

In some implementations, if the emergency session information is stored in the data structure, call control device 220 may determine whether the received call is the emergency call back based on an amount of time between the time at which the emergency session was terminated and the time at which the received call was received by call control device 220. For example, call control device 220 may determine that the received call is the emergency call back when the amount of time between the time at which the emergency call ended and/or the emergency session was terminated and the time at which the received call was received is less than a threshold amount of time. Alternatively, or additionally, call control device 220 may determine that the received call is not the emergency call back when the amount of time is greater than, or equal to, the threshold amount of time.

In some implementations, call control device 220 may have started the second emergency timer when the emergency call is ended and/or the emergency call session is terminated. The second emergency timer may have been set to the updated value and call control device 220 may determine whether the amount of time is less than the threshold amount of time based on whether the second emergency time has expired. For example, call control device 220 may determine that the amount of time is greater than, or equal to, the threshold amount of time when the second emergency timer has expired (e.g., the second emergency timer has reached zero after counting down from the updated value).

Alternatively, or additionally, call control device 220 may determine whether the call is the emergency call back based on information associated with the call. For example, the call may include call information that identifies the call as the emergency call back, as being placed by emergency call device 240 and/or emergency personnel, or other information indicating that the call is the emergency call back.

As further shown in FIG. 6B, and in those situations when the call is not an emergency call back (block 645—NO), process 600 may include sending the call to user devices associated with the virtual phone (block 650). For example, call control device 220 may determine that the call is not an emergency call back and may send the call to user devices 210 associated with the virtual phone number.

In some implementations, call control device 220 may send the call to telephone application server 230. Telephone application server 230 may receive the call and may determine that the call is associated with the virtual phone number. Telephone application server 230 may access a data structure (e.g., data structure 500) and identify which user device 210, associated with the virtual phone number, is to receive the call. Telephone application server 230 may send the call to each of the identified user devices 210. Each of the identifier user devices 210 may receive the call and may output a notification (e.g., ring, vibrate, etc.) to alert the user of the received call.

Alternatively, or additionally, telephone application server 230 may access the data structure and may determine that the virtual phone number is associated with a set of rules (e.g., stored in rules field 550) and may apply the set of rules to identify the user devices 210 to which the received call is to be sent.

As further shown in FIG. 6B, and in those situations when the call is an emergency call back (block 645—YES), process 600 may include identifying a user device used to make the emergency call (block 655) and sending the emergency call back to only the user device used to make the emergency call (block 660). For example, call control device 220 may determine that the call is an emergency call back and may identify the particular user device 210 as the user device used to make the emergency call. Call control device 220 may send the emergency call back to only the particular user device 210.

In some implementations, call control device 220 may identify the particular user device 210 based on the stored information identifying the particular user device 210 as the user device used to make the emergency call. For example, the received call may include call information that identifies the virtual phone number. Call control device 220 may access a data structure and may determine that the particular user device 210 is the user device used to make the emergency call based on the information identifying the particular user device 210 as the user device used to make the emergency call for which information is stored in the data structure.

Call control device 220 may send the emergency call back to only the particular user device 210 based on the particular user device 210 being identified as the user device used to make the emergency call.

In some implementations, call control device 220 may send the emergency call back and information identifying the particular user device 210 as the user device used to make the emergency call to telephone application server 230. For example, call control device 220 may send the emergency call back and the instance ID associated with the particular user device 210 to telephone application server 230.

In some implementations, the instance ID may be included in a SIP invite message. For example, call control device 220 may send telephone application server 230 a SIP invite message to notify telephone application server 230 of the emergency call back. Telephone application server 230 may receive the SIP invite message and may determine that the SIP invite message includes the instance ID.

In some implementations, telephone application server 230 may process the SIP invite message as an emergency call back based on the SIP invite message including the instance ID. For example, based on the SIP invite message including the instance ID, telephone application server 230 may determine that the emergency call back is to be sent to only the user device 210 associated with the instance ID. Telephone application server 230 may access a data structure (e.g., data structure 500) and may determine that the instance ID is associated with the particular user device 210. Based on the instance ID being associated with the particular user device 210, telephone application server 230 may identify that the particular user device 210 as the user device used to make the emergency call and may send the emergency call back to only the particular user device 210.

In some implementations, if the emergency call back is not answered by the particular user device 210, the emergency call back may be sent to one or more other user devices 210 associated with the virtual phone number. For example, call control device 220 and/or telephone application server 230 may determine that no one answered the emergency call back after the emergency call back was sent to the particular user device 210, and call control device 220 and/or telephone application server 230 may send the emergency call back to one or more of the other user devices 210 associated with the virtual phone number. In some implementations, the emergency call back may be sent to each user device 210 associated with the virtual phone number. In some implementations, the emergency call back may be sent to some, but not all, of the user devices 210 associated with the virtual phone number. For example, telephone application server 230 may access information stored in a data structure (e.g., information stored in rules field 550 of data structure 500) that identifies certain user devices 210, identified by the user, to which the emergency call back should be sent if the emergency call back is not answered by the user device 210 from which the emergency call was made.

Although FIGS. 6A and 6B show example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

Figure 7A:
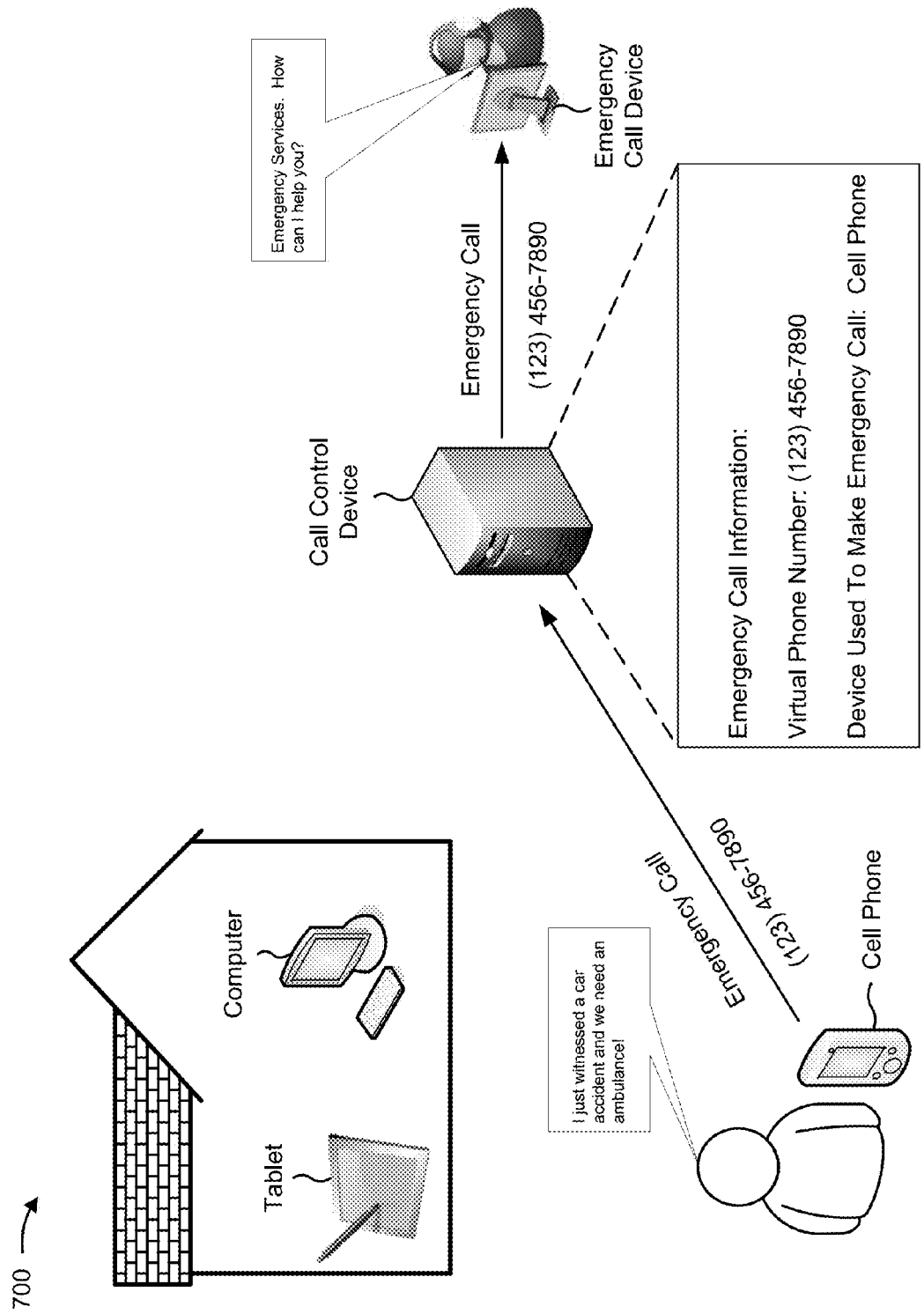
FIGS. 7A-7C are diagrams of an example implementation relating to the example process shown in FIGS. 6A and 6B.
Figure 7B:
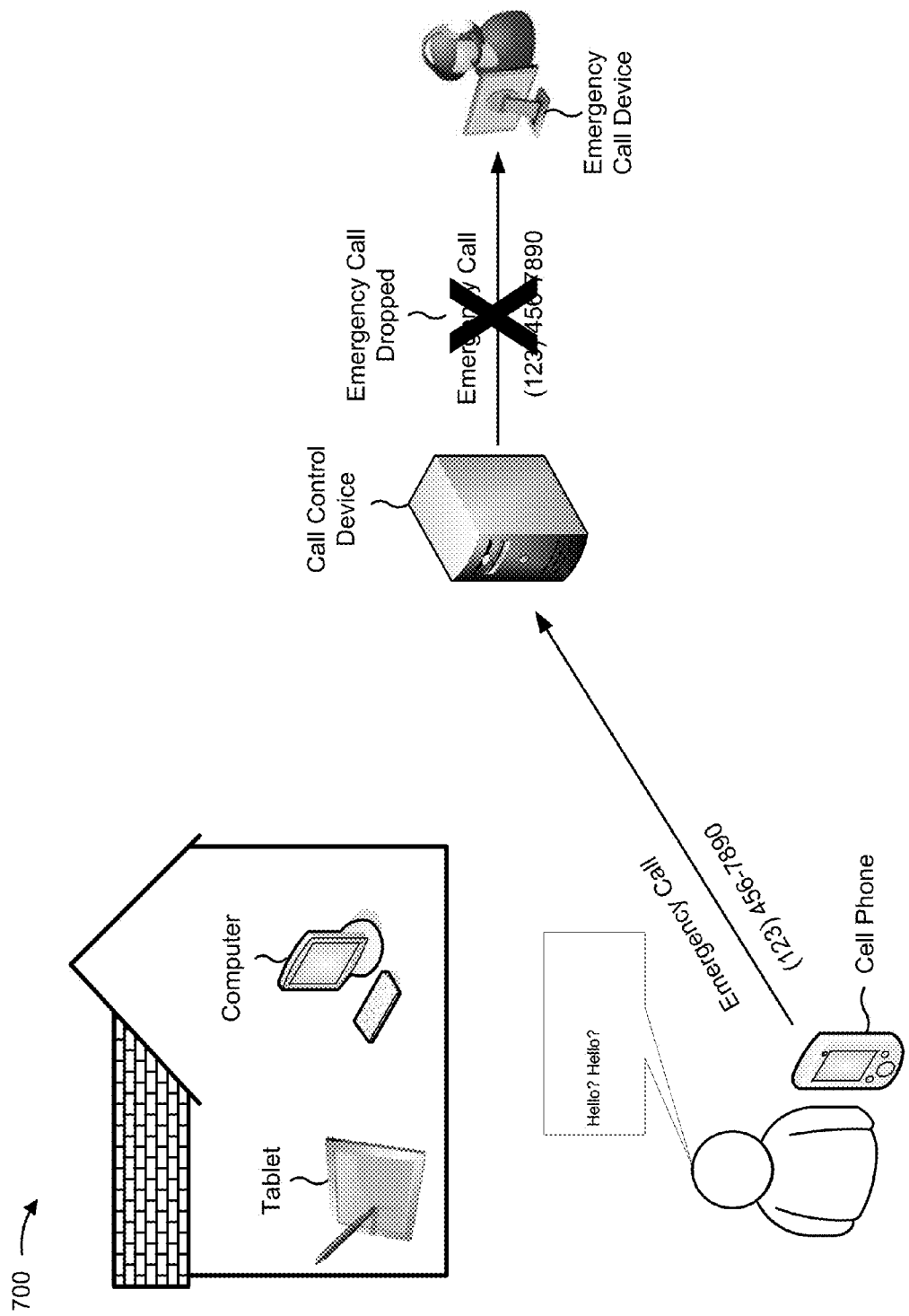
Figure 7C:
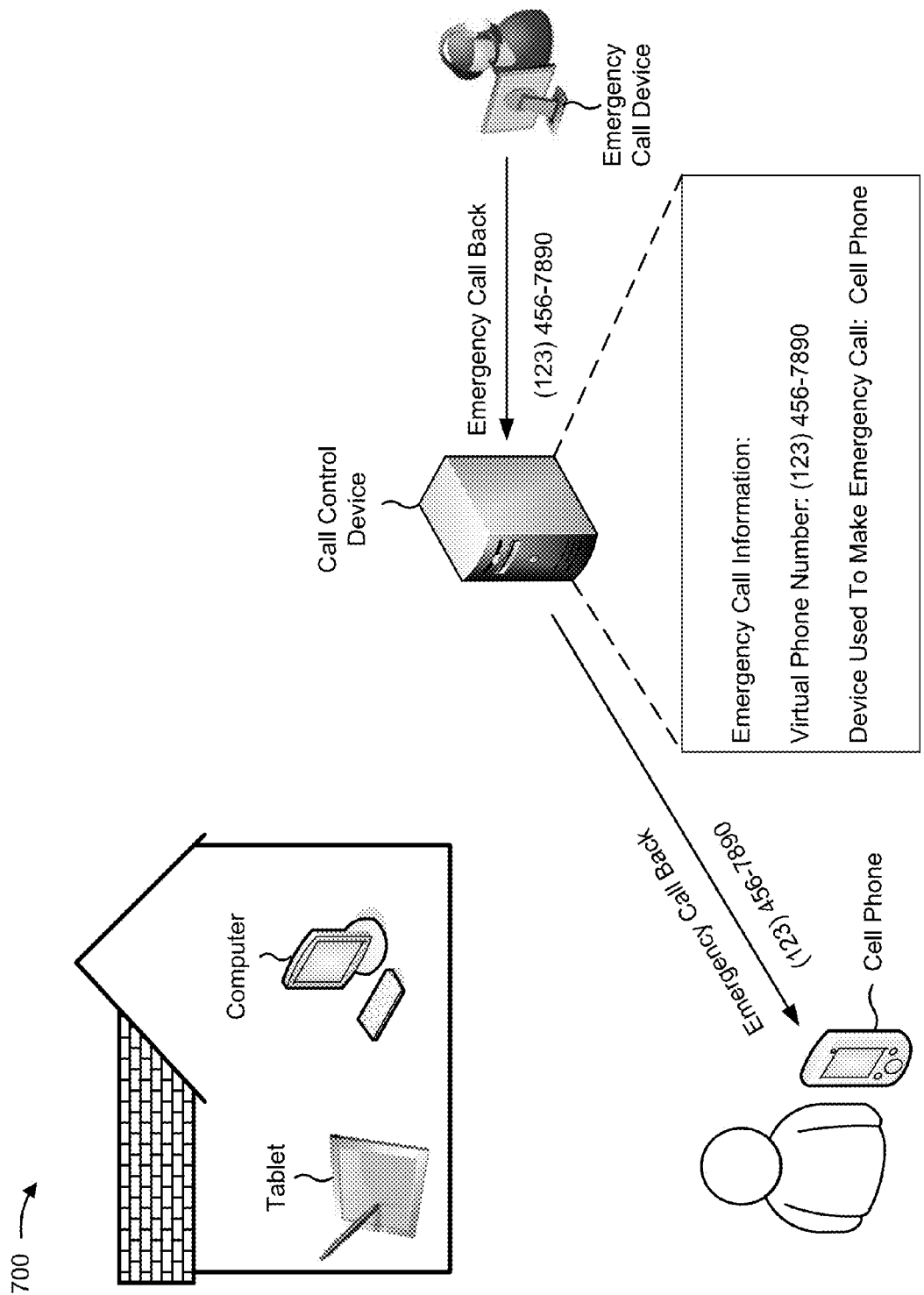

FIGS. 7A-7C are diagrams of an example implementation 700 relating to example process 600 shown in FIGS. 6A and 6B. FIGS. 7A-7C show an example of a process for sending an emergency call back to a user device from which an emergency call was made.

For example implementation 700, assume that a user has a tablet, a computer, and a cell phone that are associated with a virtual phone number, (123) 456-7890. Further, assume that the user witnesses a car accident and that the user determines that a person driving one of the cars in the car accident needs medical assistance. Referring now to FIG. 7A, the user uses the cell phone to place an emergency call to an emergency services operator. A call control device (e.g., call control device 220) receives the emergency call and determines that the emergency call is associated with a virtual phone number. The call control device stores emergency call information that identifies the cell phone as the device used to make the emergency call. The call control device forwards the emergency call to an emergency call device and the call is answered by the emergency services operator.

With reference to FIG. 7B, assume that while the user is speaking with the emergency services operator, the emergency call is dropped and the user can no longer communicate with the emergency services operator. As shown in FIG. 7C, assume that the emergency services operator places an emergency call back to the user using the virtual phone number. The emergency call back may be received by the call control device. The call control device may access the stored emergency call information and may identify the cell phone as the user device that was used to make the emergency call. The call control device may send the emergency call back to the cell phone (and not to the tablet or the computer) based on the cell phone being identified as the user device that was used to make the emergency call, thereby allowing the emergency services operator to resume communicating with the user.

As indicated above, FIGS. 7A-7C are provided merely as an example. Other examples are possible and may differ from what was described with regard to FIGS. 7A-7C.

Implementations described herein may cause an emergency call back to be sent to only the user device from which an emergency call was made, thereby allowing emergency personnel to reach a user that made the emergency call. Otherwise, if the emergency call back is sent to each user device associated with a virtual phone number, emergency personnel may be prevented from reaching the user by someone other than the user answering the emergency call back using one of the other user devices associated with the virtual phone number.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
    receiving, by a device, a first call associated with a virtual phone number,
        the virtual phone number being associated with a first user device and a second user device,
            the first user device being associated with a user and the second user device being associated with the user;
    determining, by the device, that the first call was made using the first user device;
    storing, by the device, information indicating that the first call was made using the first user device;
    receiving, by the device, a second call directed to the virtual phone number;
    determining, by the device, whether the second call comprises a call back associated with the first call;
    sending, by the device, the second call to the first user device; and
    selectively sending, by the device, the second call to the second user device based on determining whether the second call comprises the call back,
        the second call being sent to the second user device when the second call does not comprise the call back, and the second call not being sent to the second user device when the second call comprises the call back.

2. The method of claim 1, where determining whether the second call comprises the call back includes:
    determining whether an amount of time from when the first call ended until the second call was received is less than a threshold amount of time; and
    determining that the second call comprises the call back when the amount of time is less than the threshold amount of time.

3. The method of claim 1, where the first call comprises an emergency call, and
    where determining whether the second call comprises the call back includes:
        determining whether the second call comprises an emergency call back relating to the emergency call.

4. The method of claim 1, where the storing the information includes:
    storing information associating a device identifier, associated with the first user device, with the virtual phone number.

5. The method of claim 1, where the selectively sending the second call includes:
    sending the second call and the information indicating that the first call was made using the first user device to a telephone application server,
    the telephone application server causing the second call to be sent to only the first user device based on the information indicating that the first call was made using the first user device.

6. The method of claim 1 where, after sending the second call to the first user device and not sending the call to the second user device, the method further comprises:
    determining that the second call was not answered when the second call was sent to the first user device; and
    sending the second call to the second user device based on the second call not being answered when the second call was sent to the first user device.

7. A device comprising:
    one or more processors to:
        receive an emergency call,
            the emergency call being made using a particular user device of a plurality of user devices associated with a virtual phone number,
                the plurality of user devices being associated with a user;
        store information identifying the particular user device as a user device, of the plurality of user devices, that was used to make the emergency call;
        send the emergency call to an emergency call device;
        receive a call directed to the virtual phone number;
        determine whether the call comprises an emergency call back; and
        when the call comprises the emergency call back:
            identify, based on the stored information and based on determining that the call comprises the emergency call back, the particular user device as the user device that was used to make the emergency call; and
            send the call to the particular user device based on identifying the particular user device as the user device that was used to make the emergency call,
                the call being sent to the particular user device without being sent to any other user device, of the plurality of user devices, based on determining that the call comprises the emergency call back, or
        when the call does not comprise the emergency call back:
            send the call to the plurality of user devices.

8. The device of claim 7, where the one or more processors are further to:
  determine that the emergency call has ended; and
  where, when determining whether the call comprises the emergency call back, the one or more processor are to:
    determine whether the call comprises the emergency call back based on an amount of time that has elapsed from when the emergency call ended.

9. The device of claim 8, where the one or more processors are further to:
  initiate a timer based on determining that the emergency call has ended; and
  where, when determining whether the call comprises the emergency call back, the one or more processor are to:
    determine that the timer has not expired; and
    determine that the call comprises the emergency call back based on the timer having not expired.

10. The device of claim 7, where, when storing the information identifying the particular user device as the user device that was used to make the emergency call, the one or more processors are to:
  store one or more of:
    information identifying a device identifier associated with the particular user device,
    information identifying an instance identifier associated with the particular user device, or
    information identifying a description associated with the particular user device.

11. The device of claim 7, where, when sending the emergency call back to the particular user device without sending the call to any other user device, of the plurality of user devices, the one or more processors are to:
  send a session initiated protocol (SIP) invite message to a telephone application server,
    the SIP invite message including the information identifying the particular user device as the user device that was used to make the emergency call,
    the SIP invite message permitting the telephone application server to cause the emergency call back to be sent to only the particular user device based on the SIP invite message including the information identifying the particular user device as the user device that was used to make the emergency call.

12. The device of claim 7, where, when determining that the call is the emergency call back, the one or more processors are to:
  determine that the information identifying the particular user device as the user device that was used to make the emergency call is stored in a memory.

13. The device of claim 7, where, when determining whether the call comprises the emergency call back, the one or more processors are further to:
  determine whether the call comprises the emergency call back based on call information received with the call.

14. A computer-readable medium storing instructions, the instructions comprising:
  one or more instructions that, when executed by one or more processors of a device, cause the one or more processors to:
    receive an emergency call associated with a virtual phone number;
    associate a particular user device, of a plurality of user devices associated with the virtual phone number, with the emergency call based on the emergency call being associated with the virtual phone number and based on the emergency call originating from the particular user device,
      the plurality of user devices being associated with a user;
    cause the emergency call to be sent to an emergency call device;
    receive a call directed to the virtual phone number;
    determine whether the call comprises an emergency call back;
    when the call comprises the emergency call back, send the call to the particular user device, without sending the call to any other user device, of the plurality of user devices, based on determining that the call comprises the emergency call back and based on associating the particular user device with the emergency call; and
    when the call does not comprise the emergency call back, send the call to the particular user device and send the call to each of the other user devices, of the plurality of user devices, associated with the virtual phone number.

15. The computer-readable medium of claim 14, where the instructions further comprise:
  one or more instructions that, when executed by the one or more processors, cause the one or more processors to:
    initiate an emergency call session based on receiving the emergency call;
    determine that the emergency call has ended; and
    terminate the emergency call session based on the emergency call having ended; and
  where the one or more instructions to determine whether the call comprises the emergency call back include:
    one or more instructions that, when executed by the one or more processors, cause the one or more processors to:
      determine whether the call comprises the emergency call back based on a time at which the emergency call session was terminated.

16. The computer-readable medium of claim 15, where the instructions further comprise:
  one or more instructions that, when executed by the one or more processors, cause the one or more processors to:
    initiate a timer based on terminating the emergency call session; and
  where the one or more instructions to determine whether the call comprises the emergency call back include:
    one or more instructions that, when executed by the one or more processors, cause the one or more processors to:
      determine whether the timer has expired; and
      determine whether the call comprises the emergency call back based on whether the timer has expired.

17. The computer-readable medium of claim 14, where the one or more instructions to associate the particular user device with the emergency call include:
  one or more instructions that, when executed by the one or more processors, cause the one or more processors to:
    store information identifying the particular user device as a user device, of the plurality of user devices associated with the virtual phone number, that was used to make the emergency call.

18. The computer-readable medium of claim 14, where the one or more instructions to send the emergency call back to the particular user device without sending the call to any other user device include:
  one or more instructions that, when executed by the one or more processors, cause the one or more processors to:
    send the emergency call back to a telephone application server,
      the emergency call back including information identifying the particular user device as the user device that was used to make the emergency call, the information identifying the particular user device as the user device that was used to make the emergency call permitting the telephone application server to cause the emergency call back to be sent to only the particular user device.

19. The computer-readable medium of claim 14, where the one or more instructions to associate the particular user device with the emergency call include:
one or more instructions that, when executed by the one or more processors, cause the one or more processors to:
store, in a memory, emergency session information associated with the emergency call,
the emergency session information including information identifying the particular user device as the user device that was used to make the emergency call; and
where the one or more instructions to determine whether the call is the emergency call back include:
one or more instructions that, when executed by the one or more processors, cause the one or more processors to:
determine that the emergency session information is stored in the memory, and
determine that the call comprises the emergency call back based on the emergency session information being stored in the memory.

20. The computer-readable medium of claim 19, where the one or more instructions to send the emergency call back to the particular user device without sending the call to any other user device include:
one or more instructions that, when executed by the one or more processors, cause the one or more processors to:
identify the particular user device as the user device used to make the emergency call based on the information identifying the particular user device as
the user device that was used to make the emergency call included in the emergency session information, and
send the emergency call back to only the particular user device based on identifying the particular user device as the user device that was used to make the emergency call.

* * * * *